(12) United States Patent
Brown et al.

(10) Patent No.: US 11,794,783 B2
(45) Date of Patent: Oct. 24, 2023

(54) SYSTEMS AND METHODS TO ASSIST A CUSTOMER RETRIEVE A PACKAGE FROM AN AUTONOMOUS VEHICLE

(71) Applicant: Ford Global Technologies, LLC, Dearborn, MI (US)

(72) Inventors: Kristopher Karl Brown, Dearborn, MI (US); Kendra White, Redford, MI (US); Steven Wayne Friedlander, Dearborn, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 17/211,785

(22) Filed: Mar. 24, 2021

(65) Prior Publication Data
US 2022/0306165 A1  Sep. 29, 2022

(51) Int. Cl.
*B60W 60/00* (2020.01)
*G06Q 10/083* (2023.01)
*G05D 1/02* (2020.01)
*G05D 1/00* (2006.01)
*B60P 3/00* (2006.01)
(Continued)

(52) U.S. Cl.
CPC ....... *B60W 60/00256* (2020.02); *B60P 3/007* (2013.01); *B60Q 5/005* (2013.01); *B60W 40/04* (2013.01); *G05D 1/0088* (2013.01); *G05D 1/0214* (2013.01); *G06Q 10/083* (2013.01); *B60W 2420/42* (2013.01); *B60W 2420/52* (2013.01); *G05D 2201/0213* (2013.01);
(Continued)

(58) Field of Classification Search
None
See application file for complete search history.

(56) References Cited

U.S. PATENT DOCUMENTS 9,552,564 B1 * 1/2017 Martenis ............ G07C 9/00571
2018/0322775 A1 * 11/2018 Chase .................... G07C 5/008
(Continued)

OTHER PUBLICATIONS

Nuro, "Delivering Safety: NURO's Approach", www.nuro.ai, 33 pages.
(Continued)

*Primary Examiner* — Tamara L Weber
(74) *Attorney, Agent, or Firm* — Brandon Hicks; Eversheds Sutherland (US) LLP

(57) ABSTRACT

The disclosure generally pertains to systems and methods for assisting a customer retrieve a package from an autonomous vehicle. In an example procedure, the autonomous vehicle may detect the customer waiting at a first spot and may determine that the first spot is unsuitable/unsafe for the customer to retrieve a package from a locked compartment in the autonomous vehicle. The autonomous vehicle may therefore instruct the customer to move to a second spot that is safer and closer to the compartment and may then execute an authentication procedure to authenticate the customer and unlock a door of the compartment. In an alternative approach, the autonomous vehicle may travel to a parking spot that is safer and closer to where the customer is waiting (rather than instructing the customer to move) before authenticating and unlocking the door of the compartment to allow the customer to retrieve the package.

19 Claims, 4 Drawing Sheets

(51) Int. Cl.
   *B60W 40/04*   (2006.01)
   *B60Q 5/00*    (2006.01)
   *H04W 4/12*    (2009.01)
   *G08G 1/01*    (2006.01)

(52) U.S. Cl.
   CPC ....... *G06Q 2240/00* (2013.01); *G08G 1/0104* (2013.01); *H04W 4/12* (2013.01)

(56) References Cited

U.S. PATENT DOCUMENTS

| | | |
|---|---|---|
| 2019/0228375 A1 | 7/2019 | Laury et al. |
| 2020/0026281 A1 | 1/2020 | Xiao et al. |
| 2020/0356098 A1* | 11/2020 | Nix ...................... G06Q 10/025 |
| 2021/0097866 A1* | 4/2021 | Leary .................... G08G 1/202 |
| 2022/0084340 A1* | 3/2022 | Hall ....................... B60R 25/24 |
| 2022/0221867 A1* | 7/2022 | Taveira ................ G06Q 50/265 |

OTHER PUBLICATIONS

Ahti Heinla, "Hello Robot!", Starship Technologies, Nov. 28, 2018, 10 pages.

\* cited by examiner

SYSTEMS AND METHODS TO ASSIST A CUSTOMER RETRIEVE A PACKAGE FROM AN AUTONOMOUS VEHICLE

BACKGROUND

Package delivery services typically employ driver-operated vans for delivering packages to customers. In a typical scenario, a driver of a package delivery van drives the van to a customer destination, unloads a package from the van, and hand-delivers the package to the customer.

Package delivery services have begun using autonomous vehicles for delivering packages. One challenge associated with using autonomous vehicles is package theft by unscrupulous customers who may steal packages intended for other customers. Another challenge associated with using autonomous vehicles is customer safety. In some cases, an autonomous package delivery vehicle may stop on a busy street while the customer picks up his/her package from or near the vehicle. Traffic in the vicinity of the autonomous vehicle may pose an undesirable hazard to the customer.

It is therefore desirable to provide solutions that address such challenges as described above when using autonomous vehicles for delivering packages.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
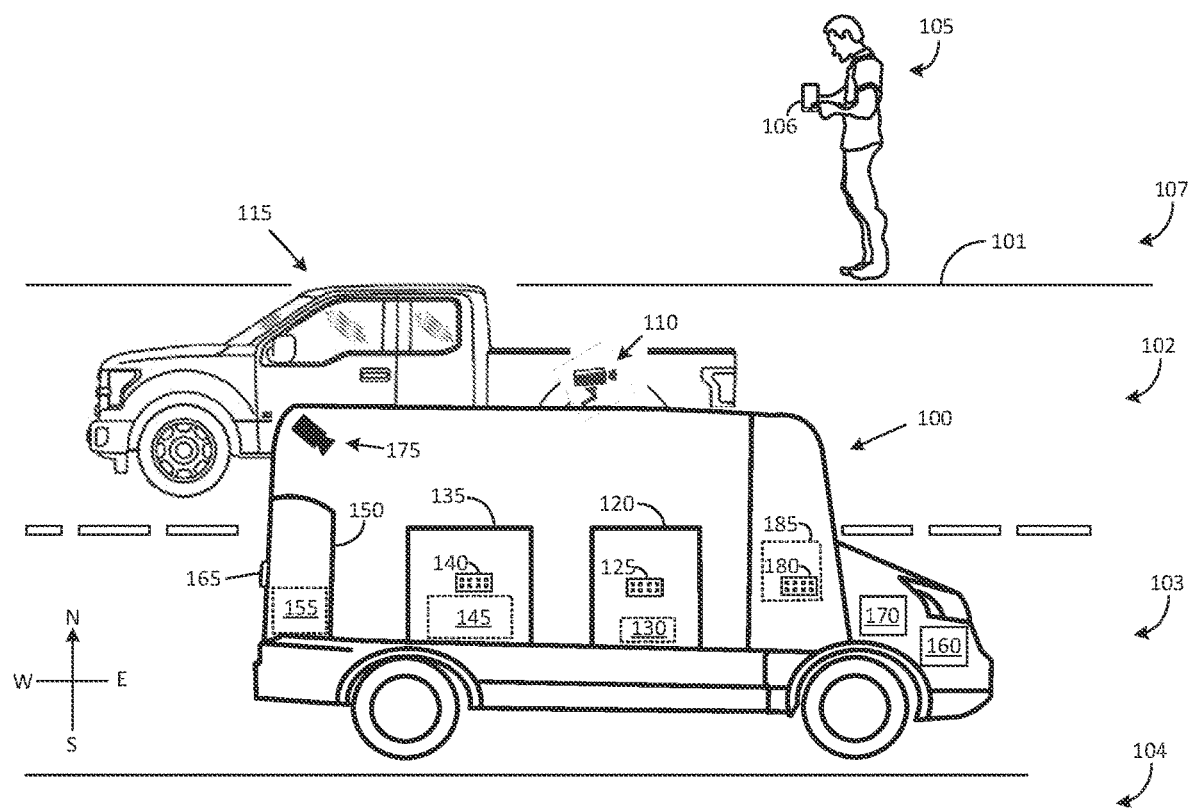
FIG. 1 illustrates a first example scenario where an autonomous vehicle is stopped at location that may pose a hazard to a customer desiring to retrieve a package from the autonomous vehicle.

In terms of a general overview, this disclosure is directed to systems and methods to assist a customer retrieve a package from an autonomous vehicle. In an example procedure, the autonomous vehicle may detect the customer waiting at a first spot and may determine that the first spot is unsuitable and/or unsafe for the customer to retrieve a package from a locked compartment in the autonomous vehicle. The first spot may be unsafe due to various reasons such as, for example, due to vehicular traffic that may be present in the vicinity of the autonomous vehicle. The autonomous vehicle may therefore instruct the customer to move to a second spot that provides access to a side of the autonomous vehicle where the compartment is located and is safer for the customer to retrieve the first package. The autonomous vehicle may then execute an authentication procedure to authenticate the customer and unlock a door of the compartment to allow the customer to retrieve the package. In another example procedure, the autonomous vehicle may stop at a first parking spot and detect the customer waiting at a location that is unsuitable/unsafe for retrieving the package. The autonomous vehicle may address this situation by traveling from the first parking spot to a second parking spot that is located close to the customer and safer for the customer to retrieve the package from the compartment. The authentication procedure may then be performed at the second parking spot to enable the customer to retrieve the package from the compartment.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases that are used herein should be interpreted as referring to various objects and actions that are generally understood in various forms and equivalencies by persons of ordinary skill in the art. For example, the word "customer" as used herein is applicable to any individual that may access an autonomous vehicle. The word "package" as used herein refers to any of various types of objects that are transportable in a vehicle. The word "compartment" as used herein is not limited to just a portion of a cargo area of a vehicle (as would be the case in some implementations when multiple compartments are provided in the cargo area of the vehicle) but can encompass the entire cargo area in some other implementations (as would be the case when the entire cargo area is configured as a locked compartment). The word "light" as used herein should be understood to refer to any kind of light source such as, for example, a lamp or a light-emitting diode (LED). Phrases such as "In an implementation" or "In one case" as used herein must be understood as an abbreviated version of the phrase "In an example implementation in accordance with the disclosure" and "In an example case in accordance with the disclosure" respectively. It should be understood that the word "example" as used herein is intended to be non-exclusionary and non-limiting in nature.

FIG. 1 illustrates a first example scenario where an autonomous vehicle 100 is stopped at location that may pose a hazard to a customer 105 desiring to retrieve a package 145 (for example) from the autonomous vehicle 100. The autonomous vehicle 100 may be configured to travel to various package drop-off locations in various ways. In an example implementation, the autonomous vehicle 100 may be configured to travel in either direction (forwards or backwards).

The autonomous vehicle 100 can be configured for delivering multiple packages to multiple customers in a manner that allows each customer to retrieve his/her package without gaining access to packages intended for other customers. Thus, for example, the customer 105 can retrieve his/her package 145 from a compartment 135 by entering an authentication code into a keypad 140 provided on a door of the locked compartment 135. The customer 105 is denied access to other packages that may be transported in the autonomous vehicle 100 for delivery to other customers such as, for example, a package 130 stored in a locked compartment 120 and a package 155 stored in a locked compartment 150. The locked compartment 150 may be unlocked by entering an authentication code into a keypad 165 provided on a door of the locked compartment 150. The locked compartment 120 may be unlocked by entering an authentication code into a keypad 125 provided on a door of the locked compartment 120.

In another implementation, one or more of the various keypads can be located on any exterior portion of the autonomous vehicle 100 and is not limited to placement upon a door of a compartment. For example, a single keypad 180 may be provided on an external surface portion 185 of the autonomous vehicle 100. The customer 105 may enter into the keypad 180 a compartment identification number and a corresponding access code in order to retrieve a package from the compartment. In some implementations, an access code that is entered by the customer 105 may be stored in a memory of a keypad (keypad 140, keypad 180, etc.) for various purposes. In an example case, the entered access code may be stored for subsequent use and access to the compartment provided if a door of the compartment is initially not opened within a preset amount of time (e.g., the user is holding a package and cannot initially open the door), a package is not retrieved from a compartment within a preset amount of time (e.g., the user is busy unloading other packages), or a package is not placed inside a compartment within a preset amount of time (e.g., the user is performing other tasks and is delayed). The preset amount of time (5 minutes, for example) may allow the customer 105 time to unload a package from a compartment and/or load a package into a compartment. In yet another implementation, a door ajar sensor may issue an alert upon detecting a door of a compartment that is in an improper condition (open, blocked, etc.).

In some instances, as the user approaches the vehicle, the user may initially be identified and authenticated by detection of a user device (e.g., a keyfob, smartphone, etc.) associated with the user. For example, the user device may be determined to be within a predetermined geofence around the vehicle. In such instances, the user may access the vehicle or a compartment of the vehicle without further authentication. In other instances, the user may be required to enter an additional authentication, such as an access code to access the vehicle or a compartment of the vehicle. If the vehicle does not detect an authenticated user via a user device, but receives an activation command of a specific door, the vehicle may prompt the user to provide an authentication via a keypad and/or guide the user to appropriate place on the vehicle to provide authentication. In such instances, upon successful authentication, the vehicle may provide access to the vehicle and/or open the door respective to the initially stored door activation command.

It must be understood that the package 145 is referred to herein merely as one example package located in an example compartment. The description is equally applicable to other packages located in other compartments. Thus, in an alternative scenario, the package 155 may be intended for delivery to the customer 105 (instead of the package 145) and the description provided herein with respect to the package 145 and the compartment 135 is equally applicable to the package 155 and the compartment 150.

Several other such compartments may be provided in a cargo area of the autonomous vehicle 100. Access to the various compartments may be provided from outside the autonomous vehicle 100 via individual doors located on various sides of the autonomous vehicle 100. In an example implementation, packages placed in a first compartment can be accessed from outside on a right side of the autonomous vehicle 100, packages placed in a second compartment can be accessed from outside on a left side of the autonomous vehicle 100 (not visible in FIG. 1), packages placed in a third compartment can be accessed from outside on a rear portion of the autonomous vehicle 100, and packages placed in a fourth compartment can be accessed from outside on a front portion of the autonomous vehicle 100.

In an example embodiment, all the compartments may be accessible from inside the cargo area of the autonomous vehicle 100 with no restrictions (no locked doors, for example) so as to allow a loader (person or robot) to load various packages into the various compartments in an unhampered manner. In some cases, an entire cargo area may be configured as a single compartment that is accessible from the outside via a door located on a rear portion of the autonomous vehicle 100, for example.

The autonomous vehicle 100 may include devices such as, for example, a camera 175 configured to captures images of the cargo area of the autonomous vehicle 100, a camera 110 configured to captures images of objects located outside the autonomous vehicle 100, a vehicle computer 160, and a package delivery apparatus 170 that is described below in more detail. The field of view of the camera 175 may be configured to encompass all the interior portions of the various compartments. Images captured by the camera 175 may be propagated to the package delivery apparatus 170 and evaluated by the package delivery apparatus 170 for various reasons such as, for example, to identify a location of a package in a compartment in the cargo area. Thus, for example, the package delivery apparatus 170 may evaluate an image provided by the camera 175 to detect and identify the package 155 located in the compartment 150, the package 145 located in the compartment 135, the package 130 located in the compartment 120, and so on. The package delivery apparatus 170 may also evaluate an image provided by the camera 175 to determine whether a package has been loaded into, or retrieved from, a compartment. A door opening sensor may be used by the package delivery apparatus 170 in lieu of, or in combination with, an image captured by the camera 175 to determine whether a package has been loaded into, or retrieved from, a compartment.

The package delivery apparatus 170 may also wirelessly communicate with a server computer, for example, to obtain information about the various packages. For example, the package delivery apparatus 170 may obtain from the server computer, recipient information for the package 145, location information of the package 145 in the cargo area (inside the compartment 135), and authentication data to verify an authentication code entered into the keypad 140. A first authentication code may be uniquely assigned to the customer 105 for entry into the keypad 140 for retrieving the package 145, a second authentication code may be assigned to a second customer for entry into the keypad 165 for retrieving the package 155, a third authentication code may be assigned to a third customer for entry into the keypad 125 for retrieving the package 130, and so on.

The camera 110 can be configured to detect various objects outside the autonomous vehicle 100 such as, for example, other vehicles, pedestrians, road signs, pedestrian crosswalks, and traffic signals. In some implementations, the camera 110 can be replaced by one or more other detection devices such as, for example, a radar device, a sonar device, and/or a light detection and ranging (LIDAR) device. In the illustrated example, the camera 110 may be arranged to have a field of view (180 degrees or 360 degrees, for example) that encompasses the road 101 as well as areas outside the road 101 such as, for example, a sidewalk 104 and a sidewalk 107. Images captured by the camera 110 may be propagated to the package delivery apparatus 170 and evaluated by the package delivery apparatus 170 for various reasons such as, for example, to detect the customer 105 waiting on the sidewalk 107.

The package delivery apparatus 170 may then identify the waiting customer 105 in various ways such as, for example, by matching a location where the customer 105 is waiting to a prescheduled package drop-off location, by exchanging text messages with the customer 105, by facial recognition, by recognizing an identifiable item of clothing worn by the customer 105, and/or by employing location techniques such as triangulation and received signal strength indication (RSSI) (using various types of wireless signals such as RF, Bluetooth®, ultra-wide-band (UWB) etc.).

In the example scenario illustrated in FIG. 1, the autonomous vehicle 100 is parked on one side of the road 101 next to the sidewalk 104. The customer 105 is waiting for the package 145 on the sidewalk 107 that is located on an opposite side of the road 101. The road 101 is a two-lane highway in this example, with traffic (such as a vehicle 115) moving westwards in a traffic lane 102 and traffic moving eastwards in a traffic lane 103.

The package 145 is located in the compartment 135 that is accessible via a door of the compartment 135 on the right side of the autonomous vehicle 100 (the side that is closest to the sidewalk 104). The package delivery apparatus 170 evaluates images captured by the camera 110 and detects traffic (such as the vehicle 115) moving in the traffic lane 102 that is located between the spot where the customer 105 is waiting and a left side of the autonomous vehicle 100. The package delivery apparatus 170 uses this information to make a determination that the spot where the customer 105 is waiting is unsuitable for the customer 105 to safely retrieve the package 145 from the right side of the autonomous vehicle 100.

In another scenario, the road 101 may be a multi-lane road and several lanes may be present between the sidewalk 107 and the left side of the autonomous vehicle 100 thereby rendering it even more unsuitable for the customer 105 to safely retrieve the package 145.

In other scenarios, various other factors may render the spot where the customer 105 is presently waiting, unsuitable for the customer 105 to safely retrieve the package 145, such as, for example, if the package 145 was stored in a compartment on the left side of the autonomous vehicle 100. In such a scenario, it would be hazardous for the customer 105 to stand in the traffic lane 102 while retrieving the package 145 from the compartment on the left side of the autonomous vehicle 100. In yet another scenario, the package 145 may be stored in a compartment on a front portion of the autonomous vehicle 100. It would be hazardous for the customer 105 to stand in front of the autonomous vehicle 100 to retrieve the package 145, while risking injury as a result of another vehicle rear-ending the autonomous vehicle 100.

Figure 2:
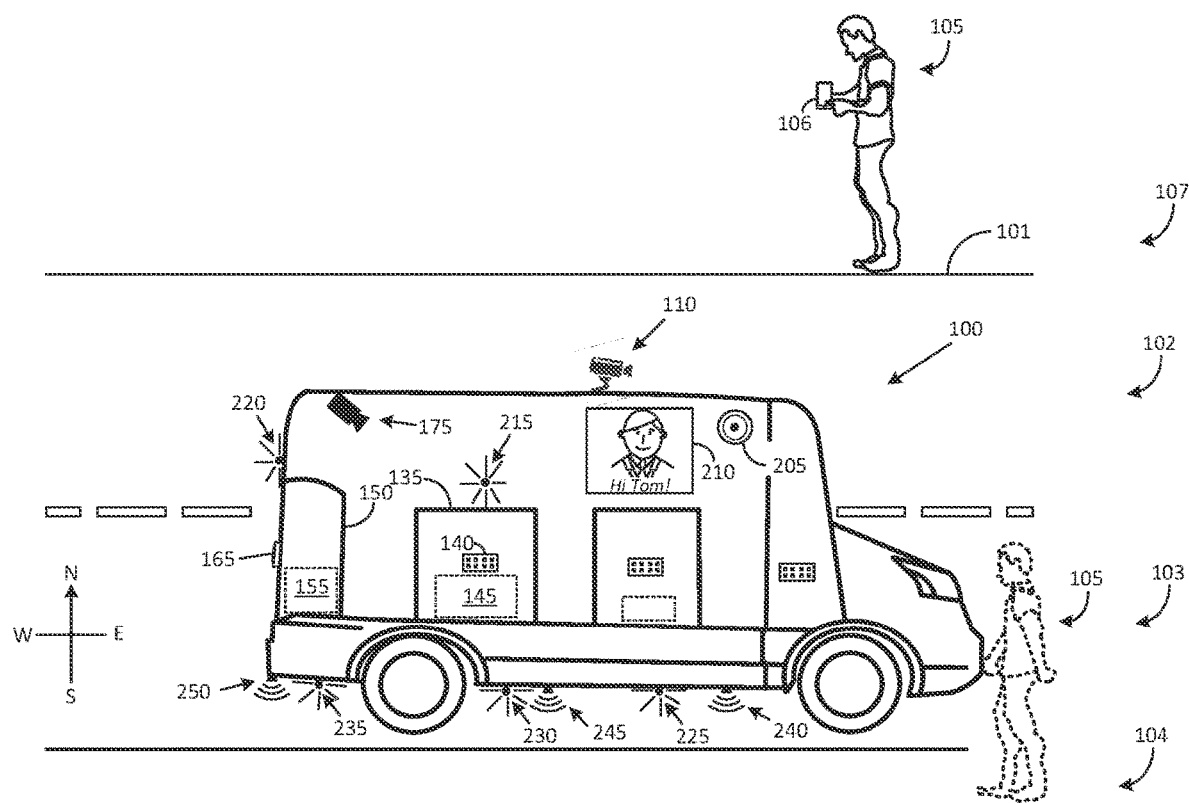
FIG. 2 illustrates an example scenario where an autonomous vehicle communicates with a customer to assist the customer retrieve a package from the autonomous vehicle in accordance with an embodiment of the disclosure.

FIG. 2 illustrates an example scenario where the autonomous vehicle 100 communicates with the customer 105 to assist the customer 105 retrieve the package 145 from the autonomous vehicle 100. In this example scenario, the customer 105 is operating a personal communication device 106 for various purposes including for purposes of communicating with the package delivery apparatus 170 (directly, or indirectly via a server computer). The personal communication device 106 can be any of various devices such as, for example, a smartphone, a smartwatch, a smart wearable, a tablet computer, or a laptop computer.

The autonomous vehicle 100 may include various devices configured to provide information to the customer 105 for retrieving the package 145 from the compartment 135 and/or any other package that is intended for the customer 105 in any other compartment. The example devices can include, for example, display screens (conventional or touch screen) and lights mounted on various portions of the autonomous vehicle 100. In the illustrated embodiment, a display screen 210 (conventional or touch-screen) is mounted on an external portion of the autonomous vehicle 100 (or on an internal portion of the autonomous vehicle 100 such as, for example, a window) such that the display screen 210 is visible to individuals located outside the right side of the autonomous vehicle 100. One or more display screens may also be mounted on other portions of the autonomous vehicle 100, in lieu of, or in addition to, the display screen 210. In various embodiments, these display screens may be arranged to be visible to individuals located on a left side of the autonomous vehicle 100, a rear portion of the autonomous vehicle 100, and/or a front portion of the autonomous vehicle 100.

The package delivery apparatus 170 is communicatively coupled to the display screen 210 (and/or other display screens) for displaying images and/or messages directed at various individuals such as, for example, the customer 105. In an example procedure, the package delivery apparatus 170 may identify the location of the package 145 in the compartment 135. The package delivery apparatus 170 may then determine that the current location of the customer 105 on the sidewalk 107 is unsuitable for the customer 105 to retrieve the package 145 (for various reasons such as due to hazards posed by traffic moving on the traffic lane 102). Upon making this determination, the package delivery apparatus 170 may communicate with the customer 105 to inform the customer to move from the sidewalk 107 to the sidewalk 104 in order to retrieve the package 145.

In a first example embodiment, the package delivery apparatus 170 may inform the customer to move by broadcasting an audio announcement through a speaker 205 provided in the autonomous vehicle 100. The announcement may be made after the package delivery apparatus 170 has made a determination that the audio broadcast is in conformance to ordinances and regulations. The package delivery apparatus 170 will refrain from making the audio broadcast if for example, a local ordinance bans such broadcasts due to noise pollution concerns and other factors (proximity to a hospital, a retirement community, a place of worship, school, etc.).

In an example audio announcement procedure, the package delivery apparatus 170 may first broadcast a welcome message such as, for example, "Hi Tom, your package is ready for pick up in this vehicle!" The welcome message may be followed by an instruction such as, for example, "Please cross the road at a safe place," or "Please cross the road at the pedestrian crossing located 100 yards behind this vehicle." The package delivery apparatus 170 may then evaluate images provided by the camera 110 (or other devices) to monitor a movement of the customer 105 in response to the broadcast messages.

In a second example embodiment, the package delivery apparatus 170 may communicate with the customer 105 by displaying an image or a text message upon a display screen (not shown) provided on the left side of the autonomous vehicle 100 (not visible in FIG. 2). This display screen is selected (rather than the display screen 210, for example) because the image or text message can be viewed by the customer 105 while waiting at the sidewalk 107. The image and/or text may include, for example, an image of a spokesperson, a company logo, a message and/or an instruction. The message can be a welcome message such as, for example, "Hi Tom, your package is stored in a compartment on the left side of this vehicle!!" or "Hi Tom, your package is ready for pick up in this vehicle!" The welcome message may be followed by an instruction such as, for example, "Please cross the road at a safe place," or "Please cross the road at the pedestrian crossing located 100 yards behind this vehicle." The package delivery apparatus 170 may evaluate images provided by the camera 110 (or other devices) to monitor a movement of the customer 105 in response to the displayed images and/or messages.

In a third example embodiment, the package delivery apparatus 170 may communicate with the customer 105 via the personal communication device 106. The communications may be carried out via direct device-to-device communications or via a network (such as, for example, a cellular communications network or the Internet). Various communication protocols may be used for this purpose in various implementations such as, for example, cellular, Bluetooth®, Ultra-Wideband (UWB), Wi-Fi, Zigbee®, Li-Fi (light-based communication), audible communication, ultrasonic communication, and/or near-field-communications (NFC).

In an example scenario, a software application may be provided in the personal communication device 106. The software application may be used to track the movement of the autonomous vehicle 100 from say, the moment the autonomous vehicle 100 leaves a warehouse to a time when the autonomous vehicle 100 stops at the location next to the sidewalk 104. The software application may also be used to exchange various types of information between the customer 105 and the package delivery apparatus 170 such as, for example, scheduling information, rendezvous information, and authentication information.

The rendezvous information can include the package delivery apparatus 170 transmitting the welcome ("Hi Tom, your package is ready for pick up in this vehicle!" for example) and the movement instruction ("Please cross the road at a safe place," for example) after the autonomous vehicle 100 is parked at the location next to the sidewalk 104. The customer 105 may acknowledge receipt of the messages from the package delivery apparatus 170 via the personal communication device 106 and start moving towards the sidewalk 104. In an example scenario, the package delivery apparatus 170 may provide navigation assistance to the customer 105 to cross the road 101 and reach the autonomous vehicle 100. The navigation guidance may be provided on the basis of data such as GPS coordinates and landmark information (pickup spot description, for example) that may be available to the package delivery apparatus 170. The package delivery apparatus 170 may then evaluate images provided by the camera 110 (or other devices) to monitor a movement of the customer 105 in response to the message exchanges.

After determining that the customer 105 has moved to the sidewalk 104 (in any of the various ways described above), the package delivery apparatus 170 may provide instructions to guide the customer 105 to the compartment 135 for retrieving the package 145.

In an example customer guidance procedure, the package delivery apparatus 170 may determine a proximity of the customer 105 to the right side of the autonomous vehicle 100 and activate a light 215 that indicates the location of the compartment 135 and the package 145 inside. The light 215, which can be mounted at any of various locations such as, for example, adjacent to the compartment 135 or in a handle of a door of the compartment 135, may be activated to produce a steady light or a flashing sequence. Other lights such as, for example, a light 220 may be activated if the package 155 in the compartment 150 is also intended for delivery to the customer 105.

In another example customer guidance procedure, the package delivery apparatus 170 may produce an audible instruction from the speaker 205 mounted on the right side of the autonomous vehicle 100. The audible instruction may be accompanied by visual instructions (images and/or text) displayed on the display screen 210 that is viewable by the customer 105 from the sidewalk 104. The visual instructions may be provided without audible instructions in some cases such as, for example, when audio broadcasts are not permitted due to local ordinances and/or regulations.

In yet another example customer guidance procedure, the package delivery apparatus 170 may activate a set of lights to produce a light sequence that indicates a direction of travel for the customer 105 and/or a set of beepers to produce a sound sequence that indicates a direction of travel for the customer 105. In the illustrated scenario, the package delivery apparatus 170 may evaluate an image provided by the camera 110 and determine that the customer 105 is located near the front end of the autonomous vehicle 100. Accordingly, the package delivery apparatus 170 may activate a light 225 followed by a light 230 and/or produce a sound through a beeper 240 followed by a sound through a beeper 245, in order to guide the customer 105 to the compartment 135 (for either loading or for retrieving a package). Other lights and/or beepers such as a light 235 and a beeper 250 may be activated to guide the customer 105 to the compartment 150 if the package 155 in the compartment 150 is also intended for delivery to the customer 105. In an example implementation, each of the lights such as the light 225, light 230, and light 235, may be mounted on a bottom surface of each of various floorboards of the autonomous vehicle 100. The illumination produced by each of these lights may be visible on a ground surface below each respective floorboard along a perimeter of the autonomous vehicle 100.

The customer 105 may retrieve the package 145 after reaching the compartment 135, by entering an authentication code into the keypad 140. In some cases, in lieu of, or in addition to, using the keypad 140, the customer 105 may enter the authentication code via the software application in the personal communication device 106. The package delivery apparatus 170 may communicate with the personal communication device 106 as a part of the authentication procedure. Upon successful authentication, the package delivery apparatus 170 may unlock the door of the compartment 135 to allow the customer 105 to retrieve the package 145.

Figure 3:
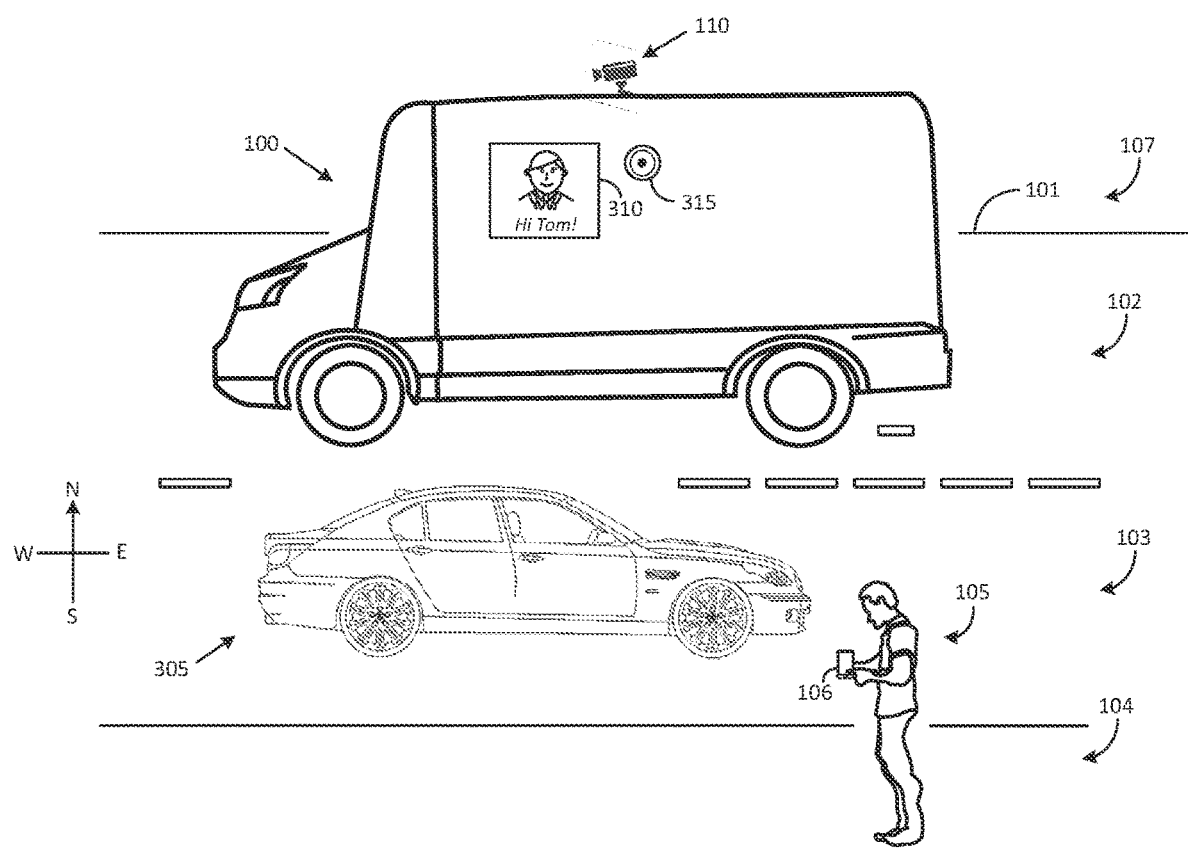
FIG. 3 illustrates an example scenario where an autonomous vehicle executes a maneuvering operation to assist a customer retrieve a package from the autonomous vehicle in accordance with an embodiment of the disclosure.

FIG. 3 illustrates an example scenario where the autonomous vehicle 100 executes a maneuvering operation to assist the customer 105 retrieve the package 145 from the autonomous vehicle 100 in accordance with an embodiment of the disclosure. In this example scenario, the customer 105 is waiting at a location on the sidewalk 104. The autonomous vehicle 100 has stopped near the sidewalk 107 and is facing west-wards. The compartment 135 containing the package 145 faces the sidewalk 107.

The package delivery apparatus 170 may evaluate images received from the camera 110 and determine that the current location of the customer 105 is unsuitable for the customer 105 to retrieve the package 145 due to hazards posed by traffic moving in the traffic lane 103 (such as a vehicle 305 that is traveling east-wards in the traffic lane 103). Upon making this determination, the package delivery apparatus 170 may communicate with the customer 105 via images displayed on a display screen 310 facing the sidewalk 104, via an audio broadcast through a speaker 315 facing the sidewalk 104, and/or via the personal communication device 106 carried by the customer 105.

In an example communication procedure, the package delivery apparatus 170 may first broadcast a welcome message such as, for example, "Hi Tom, your package is available in this vehicle!" The welcome message may be followed by an instruction such as, for example, "It is hazardous for you to cross the road to reach this vehicle. So please wait for the vehicle to come to you!" or "Please remain at your current location. The vehicle will come to you!" The package delivery apparatus 170 may then wait for an acknowledgement from the customer 105 such as, for example, a handwave towards the camera 110 or an acknowledgement message via the personal communication device 106.

After receiving the acknowledgement, the autonomous vehicle 100 may execute a maneuvering procedure to maneuver the autonomous vehicle 100 to a parking spot next to the sidewalk 104 where the customer 105 has access to the compartment 135 for retrieving the package 145. The maneuvering operation can include identifying a travel route to travel to the parking spot by moving from the traffic lane 102 to the traffic lane 103 so as to travel in the opposite direction (east-wards direction) and orient the right side of the autonomous vehicle 100 towards the customer 105. Traveling in the traffic lane 103 may involve the autonomous vehicle 100 traveling west-wards in the traffic lane 102 and making one or more turns such as a right turn, a left turn and/or a U-turn. Upon reaching the parking spot near the sidewalk 104 (as illustrated in FIG. 1), the package delivery apparatus 170 can initiate other actions such as those described above (guiding the customer 105 to the compartment 135, authenticating the customer 105, etc.).

Figure 4:
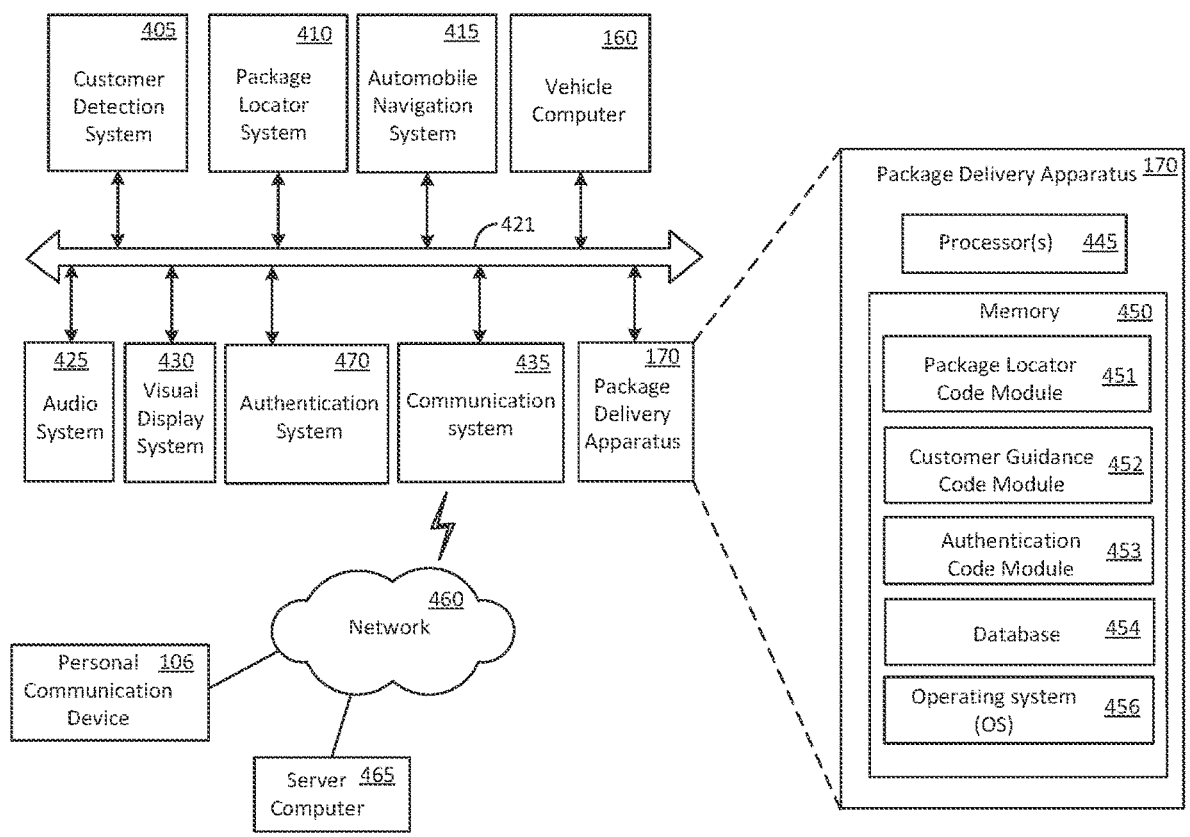
FIG. 4 illustrates some example components that may be included in an autonomous vehicle configured for delivering packages in accordance with an embodiment of the disclosure.

FIG. 4 illustrates some example components that may be included in the autonomous vehicle 100 in accordance with an embodiment of the disclosure. The example components may include a customer detection system 405, a package locator system 410, an automobile navigation system 415, an audio system 425, a visual display system 430, an authentication system 470, a communication system 435, the vehicle computer 160, and the package delivery apparatus 170.

The various components are communicatively coupled to each other via one or more buses such as an exemplary bus 421. The bus 421 may be implemented using various wired and/or wireless technologies. For example, the bus 421 can be a vehicle bus that uses a controller area network (CAN) bus protocol, a Media Oriented Systems Transport (MOST) bus protocol, and/or a CAN flexible data (CAN-FD) bus protocol. Some or all portions of the bus 421 may also be implemented using wireless technologies such as Bluetooth®, Bluetooth®, Ultra-Wideband, Wi-Fi, Zigbee®, or near-field-communications (NFC).

The customer detection system 405 can include various devices (such as, for example, the camera 110, a radar device, a sonar device, and/or a LIDAR device) that are configured to cooperate with the package delivery apparatus 170 to detect customers who are recipients of packages transported in the autonomous vehicle 100 (such as, for example, the customer 105).

The package locator system 410 can include various components such as, for example one or more cameras (such as, for example, the camera 175), one or more weight sensors configured to cooperate with the package delivery apparatus 170 to detect a presence and/or a location of various packages transported in the autonomous vehicle 100, and door ajar sensors that detect a door status of compartment doors.

The automobile navigation system 415 can include various components such as, for example, a camera, a radar device, a sonar device, a LIDAR device, and/or a global positioning system (GPS) device configured to cooperate with the vehicle computer 160 for various operations executed by the autonomous vehicle 100 (driving, stopping, avoiding collisions, navigating to various package delivery locations, etc.).

The vehicle computer 160 may perform various functions such as controlling engine operations (fuel injection, speed control, emissions control, braking, etc.) of the autonomous vehicle 100.

The audio system 425 can include various components such as, for example, an audio amplifier and one or more speakers such as, for example, the speaker 205 and the speaker 315. The audio system 425 may be configured to cooperate with the package delivery apparatus 170 to issue various audio messages to customers such as, for example, the welcome and the instruction broadcasts described above.

The visual display system 430 can include various components such as, for example, a video amplifier and one or more display screens such as, for example, the display screen 210 and the display screen 310 described above. The visual display system 430 may be configured to cooperate with the package delivery apparatus 170 to display various visual messages to customers such as, for example, the welcome and the instruction images displayed on the display screen 210 and/or the display screen 310.

The authentication system 470 can include various components such as, for example, keypads mounted on doors of various compartments of the autonomous vehicle 100 (such as, for example, the keypad 165, the keypad 140, the keypad 125, and the keypad 180), and locks on the doors of various compartments of the autonomous vehicle 100.

The communication system 435 can be communicatively coupled to the package delivery apparatus 170 (via the bus 421) and can include various components such as, for example, a radio frequency (RF) transponder that is configured for supporting wireless communications between the package delivery apparatus 170 and various devices coupled to the network 460. The various devices can include, for example, a server computer 465 and the personal communication device 106 carried by the customer 105.

The network 460 may include any one, or a combination of networks, such as a local area network (LAN), a wide area network (WAN), a telephone network, a cellular network, a cable network, a wireless network, and/or private/public networks such as the Internet. For example, the network 460 may support communication technologies such as Bluetooth®, cellular, near-field communication (NFC), Wi-Fi, Wi-Fi direct, machine-to-machine communication, and/or man-to-machine communication. At least one portion of the network 460 includes a wireless communication link that allows the package delivery apparatus 170 to communicate with the server computer 465 (using an Internet communications protocol) and the personal communication device 106 (using a cellular protocol). The package delivery apparatus 170 may communicate with the server computer 465 for various purposes such as those described above (recipient information for various packages, location information of various packages in the cargo area of the autonomous vehicle 100, and authentication data to verify an authentication code entered into a keypad.

The package delivery apparatus 170 may include various components such as, for example, a processor 445 and a memory 450. The memory 450, which is one example of a non-transitory computer-readable medium, may be used to store an operating system (OS) 456 and various code modules such as, for example, a package locator code module 451, a customer guidance code module 452, and an authentication code module 453. The code modules are provided in the form of computer-executable instructions that can be executed by the processor 445 for performing various operations in accordance with the disclosure. The memory 450 may also include a database 454.

The package locator code module 451 may be executed by the processor 445 in order to communicate with the package locator system 410 for locating various packages. In an example operation, the package locator code module 451 may be executed by the processor 445 in order to evaluate images provided by the camera 175 (and/or weight measurements provided by weight sensors) to locate and identify the package 145 in the compartment 135, the package 130 in the compartment 120, and/or the package 155 in the compartment 150.

The customer guidance code module 452 may be executed by the processor 445 in order to provide messages and instructions to customers. In an example operation, the customer guidance code module 452 may communicate with the audio system 425 and/or the visual display system 430 to provide messages and instructions such as, for example, messages and/or instructions displayed on a display screen ("Hi Tom, your package is ready for pick up in this vehicle!" and "Please cross the road at a safe place," etc.), to activate lights (a light above a compartment, a light sequence, etc.), and/or to broadcast sounds through beepers. In another example operation, the customer guidance code module 452 may communicate with the personal communication device 106 (via the communications system 435 and the network 460) to provide messages and instructions to the customer 105.

The authentication code module 453 may be executed by the processor 445 in order to authenticate a customer and unlock a compartment of the autonomous vehicle 100. In an example operation, the authentication code module 453 may evaluate an authentication code entered by the customer 105 into the keypad 140 by obtaining various types of information from the server computer 465 (if this information is unavailable in the database 454). The information can include, for example, a stored reference authentication code (for matching against an authentication code entered into a keypad), customer identification (name, address, delivery location etc.), and/or package identification (for verifying that the customer 105 is the intended recipient of the package 145 contained in the compartment 135).

Upon successful authentication, the authentication code module 453 may transmit an unlock command to the authentication system 470 to unlock a door of the compartment 135. The authentication code module 453 may further authenticate and unlock other doors of other compartments if the customer 105 has additional packages to be retrieved. The authentication code module 453 may cooperate with the authentication system 470 to ensure that the doors of other compartments containing packages for other customers remain locked so as to prevent unauthenticated access to packages stored in these other compartments.

Authentication may fail in certain scenarios such as, for example, when an incorrect authentication code is entered into a keypad. The authentication code module 453 may cooperate with the customer guidance code module 452 to display a message such as, for example, "Incorrect code entered. Please try again!" or "Number of permissible code entry attempts has been exceeded. Please contact customer service for help!" In another scenario a valid authentication code may be entered into an inappropriate keypad (such as the keypad 165 instead of the keypad 140). The authentication code module 453 may determine that the intended package 145 is stored in the compartment 135 and cooperate with the customer guidance code module 452 to provide instructions to the customer to move to the compartment 135 and enter the authentication code module into the keypad 140 instead.

In another example operation, the authentication code module 453 may evaluate an authentication code entered by the customer 105 into the personal communication device 106 (via a software application) and unlock the door of the compartment 135 after confirming that the customer 105 is the intended recipient of the package 145 located in the compartment 135. Upon receiving an incorrect authentication code, the authentication code module 453 may communicate with the software application in the personal communication device 106 for displaying a message such as "Incorrect code entered. Please try again!"

The database 454 can be used to store various types of information such as, for example, information about various packages (size, weight, address, compartment in which stored, etc.) and about various customers (names, addresses, authentication codes, etc.). The database 454 may also be used to store templates that can be customized by the customer guidance code module 452 for issuing messages and information to specific customers (such as, for example a template "Hi (xxx), your package is ready for pick up in this vehicle!" that may be used to generate "Hi Tom, your package is ready for pick up in this vehicle!").

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," "example implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous vehicle maneuver are applicable to various types of autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device can include any one memory element or a combination of volatile memory elements (e.g., random access memory (RAM, such as DRAM, SRAM, SDRAM, etc.) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced with many types of computers such as, for example, personal computers, desktop computers, laptop computers, message processors, user devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such condi- That which is claimed is:

1. A method comprising:
employing an interior camera of an autonomous vehicle to identify a plurality of compartments each configured to contain a package, the camera having a field of view configured to encompass all interior portions of each of the plurality of compartments;
identifying, with the camera, a first compartment of the plurality of compartments inside the autonomous vehicle where a first package is stored for delivery to a customer;
determining that the customer is waiting at a first spot outside the autonomous vehicle;
determining that the first spot is unsuitable for the customer to retrieve the first package from the first compartment inside the autonomous vehicle;
instructing the customer to move from the first spot to a second spot on a first side of the autonomous vehicle for retrieving the first package from the first compartment inside the autonomous vehicle, based in part on the position of the first compartment with respect to the first side of the autonomous vehicle;
executing an authentication procedure to authenticate the customer;
unlocking a first door of the first compartment, subject to a successful authentication, to allow the customer to retrieve the first package; and
determining the first package has been retrieved from the first compartment by taking an image of the first compartment with the camera and evaluating the image.

2. The method of claim 1, further comprising:
retaining a second door of a second compartment of the autonomous vehicle in a locked condition to prevent access to a second package stored in the second compartment.

3. The method of claim 1, wherein determining that the first spot is unsuitable for the customer to retrieve the first package from the first compartment inside the autonomous vehicle comprises:
detecting a traffic lane and/or vehicular traffic moving in the traffic lane, the traffic lane located between the first spot and a second side of the autonomous vehicle.

4. The method of claim 1, wherein instructing the customer to move from the first spot to the second spot comprises:
issuing a visual instruction, an audible instruction, and/or a text message to guide the customer from the first spot to the second spot.

5. The method of claim 4, wherein issuing the visual instruction and/or the audible instruction comprises activating a series of lights in a light sequence that indicates a direction of travel for the customer to reach the first compartment, activating a set of beepers that are configured to produce a sound sequence that indicates the direction of travel for the customer to reach the first compartment, and/or displaying an instruction on a display screen that is visible to the customer.

6. The method of claim 4, wherein issuing the text message comprises transmitting the text message to a personal communication device of the customer.

7. The method of claim 1, wherein the first side of the autonomous vehicle is one of a front side, a rear side, a right side, or a left side of the autonomous vehicle.

8. A method comprising:
employing an interior camera of an autonomous vehicle to identify a plurality of compartments each configured to contain a package, the camera having a field of view configured to encompass all interior portions of each of the plurality of compartments;
identifying, with the camera, a first compartment of the plurality of compartments inside the autonomous vehicle where a first package is stored for delivery to a customer;
determining that the customer is waiting at a first spot outside the autonomous vehicle;
determining that the first spot is unsuitable for the customer to retrieve the first package from the first compartment inside the autonomous vehicle;
maneuvering the autonomous vehicle to a second spot where the customer has access to the first compartment for retrieving the first package, based in part on the position of the first compartment with respect to the first side of the autonomous vehicle;
executing an authentication procedure to authenticate the customer;
unlocking a first door of the first compartment, subject to a successful authentication, to allow the customer to retrieve the first package; and
determining the first package has been retrieved from the first compartment by taking an image of the first compartment with the camera and evaluating the image.

9. The method of claim 8, wherein determining that the first spot is unsuitable for the customer to retrieve the first package from the first compartment inside the autonomous vehicle comprises:
detecting a traffic lane and/or vehicular traffic moving in the traffic lane, the traffic lane located between the first spot and a second side of the autonomous vehicle.

10. The method of claim 9, wherein maneuvering the autonomous vehicle to the second spot where the customer is located comprises:
identifying a travel route to travel to the second spot; and
moving on the traffic lane in a direction that orients a side of the autonomous vehicle towards the customer.

11. The method of claim 10, wherein identifying the travel route to travel to the second spot comprises the autonomous vehicle making a left turn, a right turn, and/or a U-turn.

12. The method of claim 11, further comprising:
issuing a visual instruction, an audible instruction, and/or a text message to guide the customer to move from the first spot to the second spot.

13. The method of claim 12, wherein issuing the visual instruction and/or the audible instruction comprises activating a series of lights in a light sequence that indicates a direction of travel for the customer to reach the first compartment, activating a set of beepers that are configured to produce a sound sequence that indicates the direction of travel for the customer to reach the first compartment, and/or displaying an instruction on a display screen that is visible to the customer.

14. The method of claim 10, further comprising:
executing an authentication procedure to authenticate the customer;
unlocking a first door of the first compartment, subject to a successful authentication, to allow the customer to retrieve the first package; and retaining a second door of a second compartment of the autonomous vehicle in a locked condition to prevent access to a second package stored in the second compartment.

15. The method of claim 14, wherein the authentication procedure is executed by the customer upon a personal communication device.

16. An autonomous vehicle comprising:
a plurality of compartments;
an interior camera having a field of view configured to encompass all interior portions of each of the plurality of compartments; and
a package delivery apparatus comprising:
    a memory that stores computer-executable instructions; and
    a processor configured to access the memory and execute the computer-executable instructions to perform operations comprising:
        identifying, with the camera, a first compartment of the plurality of compartments inside the autonomous vehicle where a first package is stored for delivery to a customer;
        detecting the customer waiting at a first spot outside the autonomous vehicle;
        determining that the first spot is unsuitable for the customer to retrieve the first package from the first compartment inside the autonomous vehicle;
        instructing the customer to move from the first spot to a second spot on a first side of the autonomous vehicle for retrieving the first package from the first compartment inside the autonomous vehicle, based in part on the position of the first compartment with respect to the first side of the autonomous vehicle;
        executing an authentication procedure to authenticate the customer;
        unlocking a first door of the first compartment, subject to a successful authentication, to allow the customer to retrieve the first package; and
        determining the first package has been retrieved from the first compartment by taking an image of the first compartment with the camera and evaluating the image.

17. The autonomous vehicle of claim 16, wherein
the camera provides location information to the package delivery apparatus for identifying the first compartment inside the autonomous vehicle; and
a device that detects the customer located at the first spot and provides location information of the customer to the package delivery apparatus.

18. The autonomous vehicle of claim 17, wherein the autonomous vehicle further comprises:
an authentication system configured to accept input from the customer and provide authentication information to the package delivery apparatus.

19. The autonomous vehicle of claim 17, wherein the camera is a first camera, wherein the autonomous vehicle further comprises a door ajar sensor, and/or a weight sensor, wherein the device is a second camera, and wherein the autonomous vehicle further comprises a radar device, and/or a LIDAR device.

* * * * *